Feb. 19, 1952  W. D. PECK  2,586,177
QUICK DETACHABLE WHEEL
Filed March 16, 1950  4 Sheets-Sheet 1

*INVENTOR.*
WOOLSEY D. PECK
BY
Hyde, Meyer, Baldwin & Doran
ATTORNEYS

Feb. 19, 1952 W. D. PECK 2,586,177
QUICK DETACHABLE WHEEL
Filed March 16, 1950 4 Sheets-Sheet 2

INVENTOR.
WOOLSEY D. PECK
BY
*Hyde, Meyer, Baldwin & Doran*
ATTORNEYS

Feb. 19, 1952     W. D. PECK     2,586,177
QUICK DETACHABLE WHEEL
Filed March 16, 1950     4 Sheets—Sheet 3
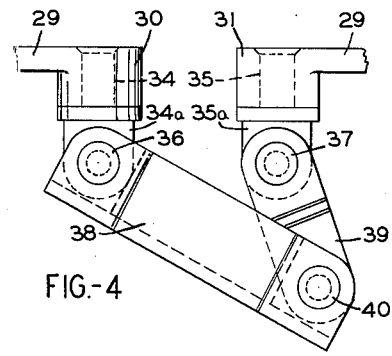
FIG.-4
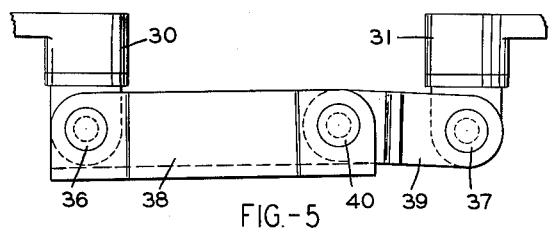
FIG.-5
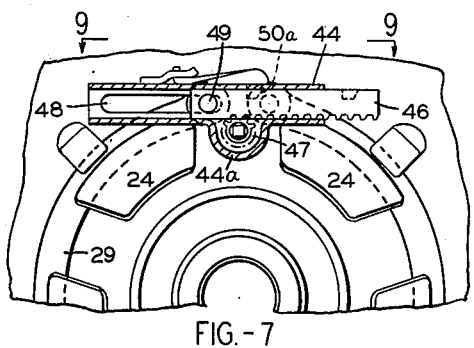
FIG.-7
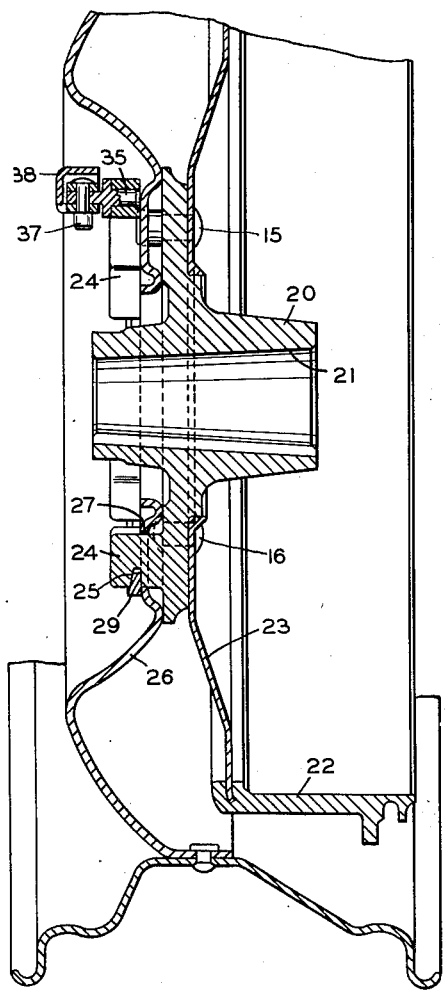
FIG.-6
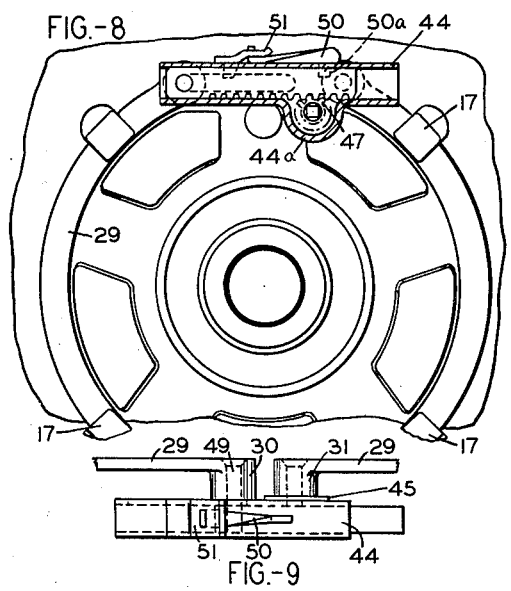
FIG.-8
FIG.-9
INVENTOR.
WOOLSEY D. PECK
BY
*Hyde, Meyer, Baldwin & Doran*
ATTORNEYS Feb. 19, 1952 W. D. PECK 2,586,177
QUICK DETACHABLE WHEEL
Filed March 16, 1950 4 Sheets-Sheet 4

*INVENTOR.*
WOOLSEY D. PECK
BY
Hyde, Meyer, Baldwin & Doran
ATTORNEYS

Patented Feb. 19, 1952

2,586,177

UNITED STATES PATENT OFFICE 2,586,177

QUICK DETACHABLE WHEEL

Woolsey D. Peck, Detroit, Mich., assignor to Edward H. Kramer, Detroit, Mich.

Application March 16, 1950, Serial No. 150,003

10 Claims. (Cl. 301—9)

The invention relates to quickly detachable vehicle wheels and to novel and improved structures therefor. It is particularly adapted to the provision of means for rapidly removing automobile wheels of the disc type, even under difficult surrounding circumstances, such as weather, road conditions and the like.

Those accustomed to driving automobiles, either pleasure vehicles or trucks, and particularly the latter, are unpleasantly aware of the fact that it is a laborious and sometimes dangerous task to remove a wheel, for example when a tire goes flat. An object of the present invention is to provide means for immediately removing the wheel, of course, after the vehicle has been elevated by a jack, and just as quickly replacing it by a spare wheel, or by the original wheel after the tire has been repaired.

Other objects and advantages will be apparent from a study of the following specification, in conjunction with the accompanying drawings, in which Fig. 1 is a side elevational view of one embodiment of my invention, the wheel hub cap being removed, and the wheel locked in place by means of a locking ring.

Fig. 4 is a sectional view, somewhat enlarged, taken on the line 4—4 of Fig. 1.

Fig. 5 is a view similar to Fig. 4, but with the operating leverage fully expanded.

Fig. 6 is a vertical sectional view taken on the line 6—6 of Fig. 1.

Fig. 7 is a fragmentary side elevational view showing another embodiment of my invention.

Fig. 8 is a view similar to Fig. 7 but with the locking ring expanded.

Fig. 9 is a top plan view taken on the line 9—9 of Fig. 7.

Figure 1:
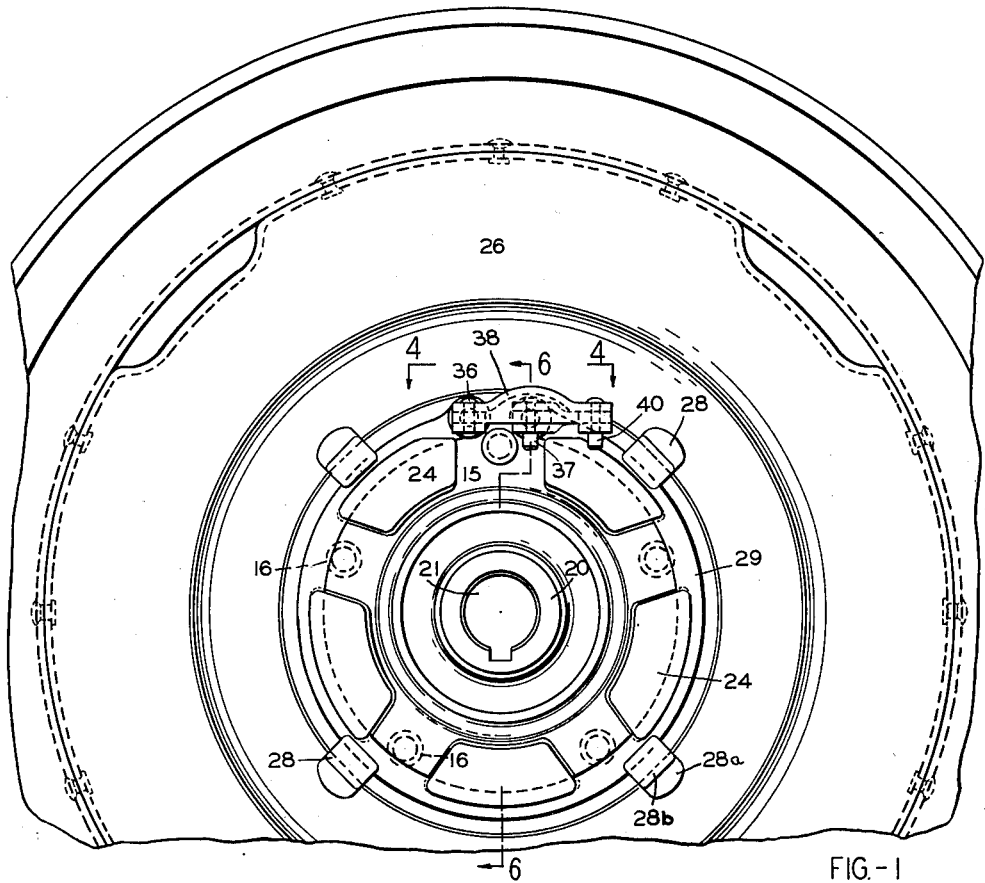
Figure 2:
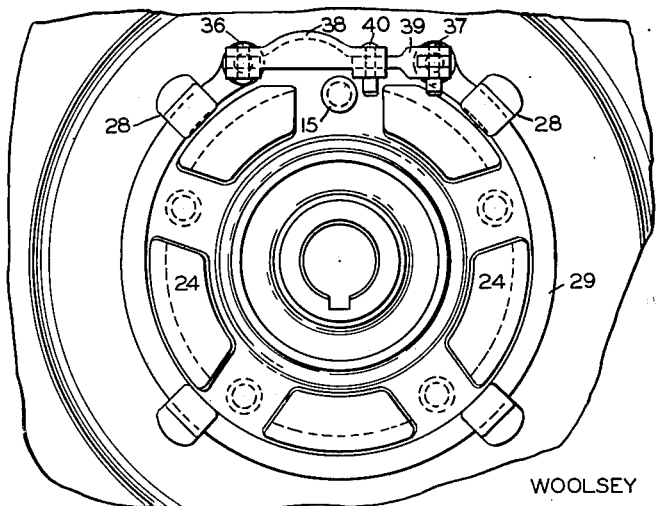
Fig. 2 is a view similar to Fig. 1 but with the locking ring expanded to permit removal of the wheel.

Speaking first generally, all embodiments shown herein disclose a wheel of conventional disk type, with such structural changes as are required to accommodate my novel attaching and detaching mechanism. The disk structure is adapted to be fitted over a hub structure having a plurality of projections which extend through apertures in the disk structure. A locking ring of novel type, movably retained on the disk structure when not in working position, is snapped into place in aligned groove segments in the projections whereby to retain the disk structure on the hub structure. The ring is of spring type, and is provided with means for radially expanding it out of the grooves to permit rapid removal of the disk structure.

Proceeding now to the embodiment shown in Figs. 1 to 6 inclusive, I show a hub structure 20 having a tubular portion provided with a central bore 21 for the reception of an axle (not shown). Attached to the inner face of the hub structure (Fig. 6) is a brake drum 22 on a drum carrying disk 23. A rivet 15 serves two purposes, namely (1) to hold the brake assembly in position and (2) to provide a support for the disk structure when removing or replacing the disk structure to prevent it from dropping into the slot provided for securing the locking ring hereinafter to be described. A conventional rivet 16 is used in four spaced locations to secure the brake drum assembly to the hub structure. Extending axially outwardly from the outer face of the radially disposed flange portion of the hub are spaced projections 24 which may be of any particular shape adapted to have interrupted segments of an aligned circular groove 25 in their radially outer periphery, as best seen in the exploded view of Fig. 3.

Figure 3:
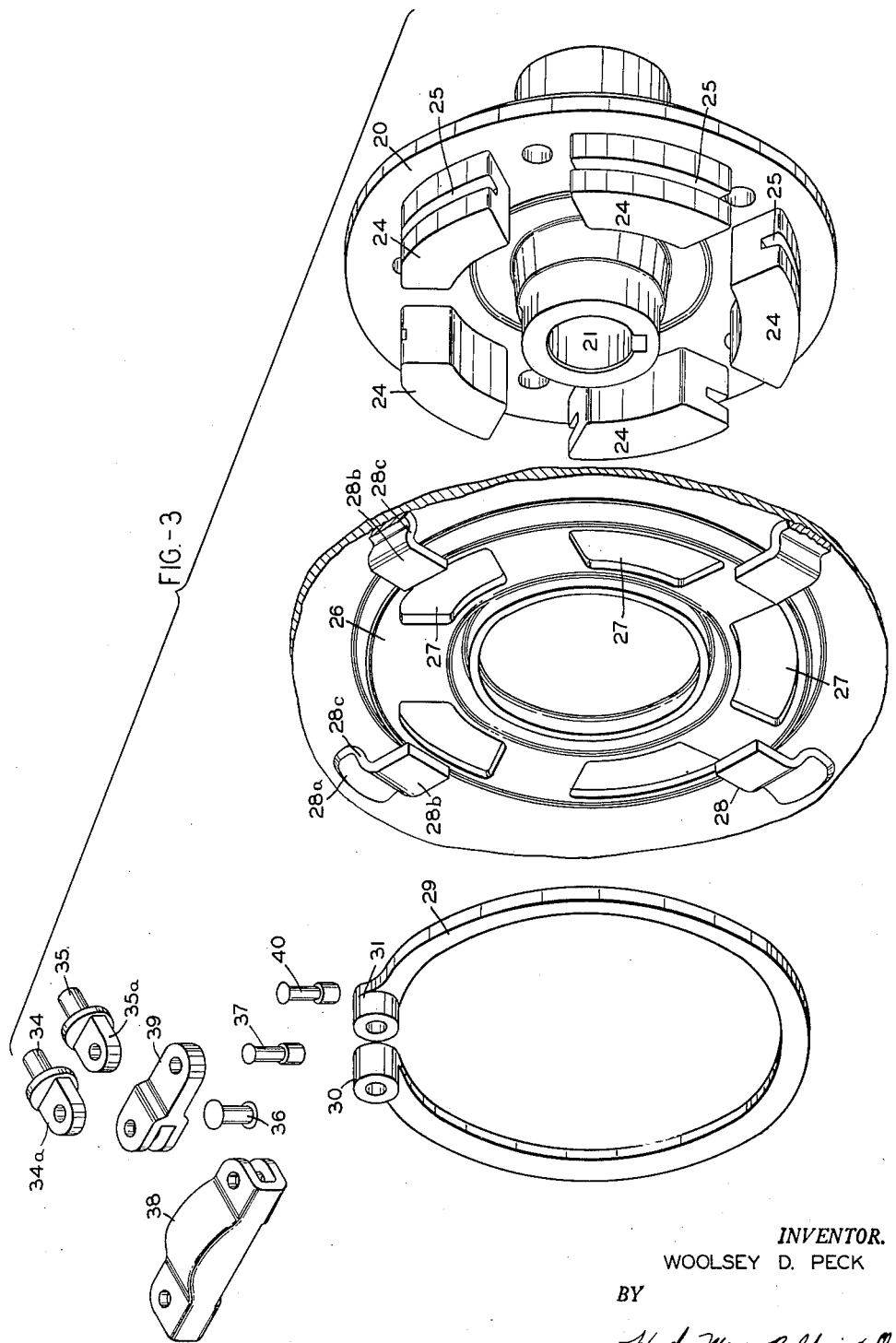
Fig. 3 is an exploded perspective view showing various operating parts of Fig. 1.
Figure 10:
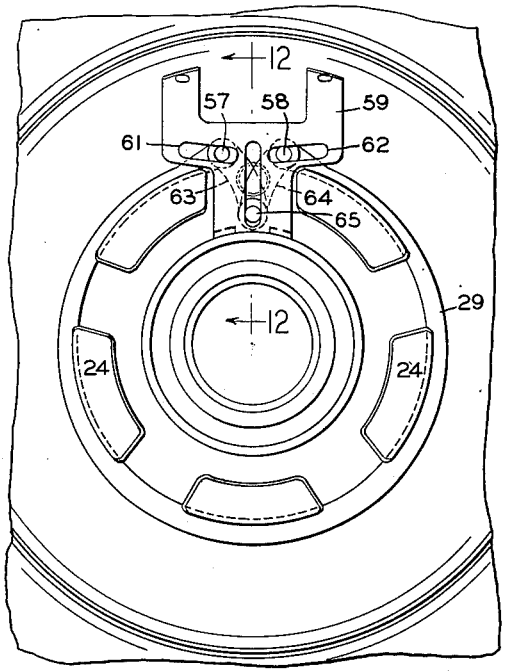
Fig. 10 is a side elevational view showing yet another embodiment of my invention.
Figure 12:
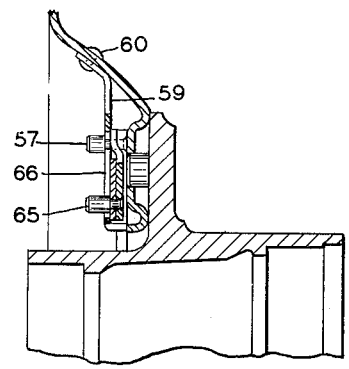
Fig. 12 is a sectional view taken on the line 12—12 of Fig. 10.

Supportable on the hub structure is the disk structure 26 having a plurality of spaced apertures 27 in the web portion thereof, the apertures being designed, in number and shape, to slip over projections 24, as best seen in Figs. 3 and 6. On the axially outer face of disk structure 26 are a plurality of retaining lugs 28, Z shaped in section, having one leg 28a thereof rigidly attached to the disk face, and the parallel leg 28b inwardly overhanging to retain a locking ring 29 thereunder. Ring 29 is split, and its adjacent ends are provided with bored bosses 30 and 31.

Fixed in the bosses 30 and 31 are a pair of pins 34 and 35 provided with ears 34a and 35a. The ears are pierced to receive pivot pins 36 and 37 of a toggle linkage consisting of jackknifing arms 38 and 39, the opposing ends of which are pivoted on pins 36 and 37, and the central toggle joint is pivoted on a pin 40. The ends of the links are suitably bifurcated to receive the ears 34a and 35a.

The ring 29, when in idle position with the disk structure off the hub structure lies loosely retained under the legs 28b of lugs 28, and is radially contracted by its normal spring bias to such an extent that it will not pass over the radial periphery of supporting projections 24. By operating the toggle linkage from the position shown in Fig. 4 to that shown in Fig. 5 the ring is moved axially outwardly approximately into contact with the central portions 28c of lugs 28, in which position the toggle has moved slightly over center so as to maintain the ring expanded. When so expanded the disk structure can be picked up and disposed on the hub structure, the supporting projections 24 extending axially outwardly through apertures 27. When the position shown in Fig. 6 is reached the toggle leverage is collapsed, and the ring 29, one side of which has an inward tapered convergence, enters groove 25, one side of which also has an inward tapered convergence, the combination of the taper of the ring and groove producing a wedging effect which not only tends to tighten the disk structure on the hub structure, but even gets tighter in service as the movement of the vehicle is communicated to the disk structure.

It will now be obvious that the disk structure can be instantly removed by swinging the toggle leverage to extend the links to full length, this movement extricating the ring from the grooves, after which the disk structure can be lifted from the hub structure.

Another embodiment of the invention is shown in Figs. 7 to 9 inclusive. In this embodiment I have substituted a rack and pinion as a means for forcing the ring open to clear the grooves. A housing 44 is fixed to a flange 45 attached to boss 31 on ring 29. The housing is elongated and serves as a guide for endwise movement of a rack 46 therein, the end of the rack being connected to boss 30 on ring 29. A semicylindrical bay 44a on housing 44 carries a pinion 47 which is in engagement with the rack. Rotation of the pinion by means of any suitable crank or tool causes movement of the rack up to a maximum distance determined by the length of the housing slot 48 in which rides the pin 49 connecting the rack to boss 30. To prevent undesired rearward motion of the rack under the spring bias of ring 29, I have shown a locking dog 50 hinged to a tab 51 on top of the housing, the dog having a finger 50a which is adapted to drop through an aperture in the top of the housing into one of a series of depressions in the top of the rack to releasably hold the rack, for example, in the position shown in Fig. 8. The operation of the device will otherwise be obvious from what has been said about the previous embodiment.

The lugs 17 serve two purposes, namely (1) to hold the ring down in proper position and (2) to act as a radial locator for the ring to assure the ring being held concentrically, and not remaining partially in the groove when expanded.

Figure 13:
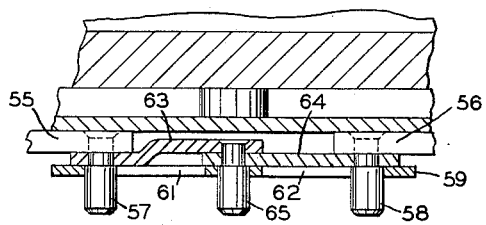
Fig. 13 is a sectional view taken on the line 13—13 of Fig. 11.

Figs. 10 to 14 inclusive illustrate yet another embodiment of the invention. In this embodiment the ring 29 has bored ends 55 and 56 having therein fixed pins 57 and 58. A guide plate 59 is fixed on the disk structure at 60 (Fig. 12) and has therein guide slots 61 and 62 in which pins 57 and 58 can travel during radial expansion and contraction of the ring. A toggle linkage 63, 64 has a central pivot on pin 65, the ends of the links being pivotally connected to respective pins 57 and 58 (Fig. 13). Pin 65 can travel in a vertical slot 66 in guide plate 59. This toggle linkage is analogous to the linkage shown in Figs. 1 to 6 except that in the former embodiment the toggle moves in a horizontal plane while in the present embodiment the toggle moves in a vertical plane.

Figure 11:
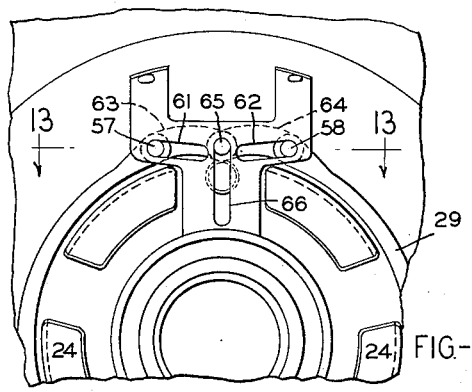
Fig. 11 is a view similar to Fig. 10 but with the ring expanded.
Figure 14:
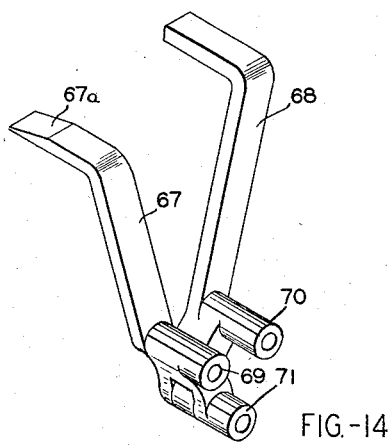
Fig. 14 is a perspective view of a tool suitable for operation of the locking ring mechanism shown in Figs. 10, 11, 12 and 13.

In Fig. 14 I show a scissors-like tool having a pair of pivoted operating arms 67, 68 and three operating sockets 69, 70 and 71. Considering the position of the pins 57, 58 and 65 in Fig. 10, in which the ring is contracted to disk securing position, if the sockets 69, 70, and 71 are telescopingly applied on pins 57, 58 and 65 respectively, and the arms 67 and 68 then swung apart, the pins will be forcibly moved to the opposite ends of their respective slots, the operating elements assuming the positions shown in Fig. 11, in which the ring has been expanded by the toggle arm so that the disk structure can be stripped from the hub. Movement of the tool arms in the opposite direction will of course permit the ring to contract. Fig. 11 shows the toggle linkage slightly above dead center so that the toggle will maintain this position until forcibly retracted. Arm 67 of the tool has a wedge shaped end 67a to serve in removing a hub cap, or the like.

What I claim is:

1. A quick detachable wheel assembly, comprising a hub structure having an axle-receiving tubular portion and a radially disposed flange portion surrounding said tubular portion, said flange portion being provided with circumferentially spaced projections extending axially outwardly, a disk structure having a central opening to receive said tubular portion and having a surrounding web portion for disposition along the axially outer surface of said flange portion, said web portion being provided in spaced relation to said opening with apertures to receive the projections of said hub portion, said projections being of a length to project axially outwardly beyond those parts of the web portion of each of said projections being provided on its radial outer surface with a ring-receiving groove, a resilient split ring disposed on the axially outer surface of the web portion of said disk structure for removable seating engagement in the grooves of said projecting portions, said ring having a normal tendency to radially contract to a size to seat in such grooves, and toggle linkage pivotally connected to the end portions of said ring for effecting, upon movement toward straightening relationship, radial expansion of said ring to disengage it from said grooves and thereby permit removal of the disk structure from the hub structure, said toggle linkage being provided with bodily movable portions for manipulation in effecting straightening movement of the linkage, said bodily movable manipulating portions extending axially outward substantially beyond the adjacent outermost axial surfaces of the links of said linkage for convenient access thereto.

2. A quick detachable wheel assembly, comprising a hub structure having an axle-receiving tubular portion and a radially disposed flange portion surrounding said tubular portion, said flange portion being provided with circumferentially spaced projections extending axially outwardly, a disk structure having a central opening to receive said tubular portion and having a surrounding web portion for disposition along the axially outer surface of said flange portion, said web portion being provided in spaced relation to said opening with apertures to receive the projections of said hub portion, said projections being of a length to project axially outwardly beyond those parts of the web portion which surround said apertures and the projecting portion of each of said projections being provided on its radial outer surface with a ring-receiving groove, a resilient split ring disposed on the axially outer surface of the web portion of said disk structure for removable seating engagement in the grooves of said projection portions, said ring having a normal tendency to radially contract to a size to seat in such grooves, and toggle linkage pivotally connected to the end portions of said ring for effecting, upon movement toward straightening relationship, radial expansion of said ring to disengage it from said grooves and thereby permit removal of the disk structure from the hub structure, said toggle linkage being provided at the pivotal connections thereof with bodily movable portions for manipulation in effecting straightening movement of the linkage, said bodily movable manipulating portions extending axially outward substantially beyond the adjacent outermost axial surfaces of the links of said linkage for convenient access thereto.

3. A quick detachable wheel assembly, comprising a hub structure having an axle-receiving tubular portion and a radially disposed flange portion surrounding said tubular portion, said flange portion being provided with circumferentially spaced projections extending axially outwardly, a disk structure having a central opening to receive said tubular portion and having a surrounding web portion for disposition along the axially outer surface of said flange portion, said web portion being provided in spaced relation to said opening with apertures to receive the projections of said hub portion, said projections being of a length to project axially outwardly beyond those parts of the web portion which surround said apertures and the projecting portion of each of said projections being provided on its radial outer surface with a ring-receiving groove, a resilient split ring disposed on the axially outer surface of the web portion of said disk structure for removable seating engagement in the grooves of said projecting portions, said ring having a normal tendency to radially contract to a size to seat in such grooves, and toggle linkage pivotally connected to the end portions of said ring for effecting, upon movement toward straightening relationship, radial expansion of said ring to disengage it from said grooves and thereby permit removal of the disk structure from the hub structure, said toggle linkage being provided with bodily movable pin-like portions for manipulation in effecting straightening movement of the linkage, said bodily movable manipulating portions extending axially outward substantially beyond the adjacent outermost axial surfaces of the links of said linkage for convenient access thereto.

4. A quick detachable wheel assembly, comprising a hub structure having an axle-receiving tubular portion and a radially disposed flange portion surrounding said tubular portion, said flange portion being provided with circumferentially spaced projections extending axially outwardly, a disk structure having a central opening to receive said tubular portion and having a surrounding web portion for disposition alongside the axially outer surface of said flange portion, said web portion being provided in spaced relation to said opening with apertures to receive the projections of said hub portion, said projections being of a length to project axially outwardly beyond those parts of the web portion which surround said apertures and the projecting portion of each of said projections being provided on its radial outer surface with a ring-receiving groove, a resilient split ring disposed on the axially outer surface of the web portion of said disk structure for removable seating engagement in the grooves of said projecting portions, said ring having a normal tendency to radially contract to a size to seat in such grooves, toggle linkage pivotally connected to the end portions of said ring for effecting, upon movement toward straightening relationship, radial expansion of said ring to disengage it from said grooves and thereby permit removal of the disk structure from the hub structure, said toggle linkage being provided with bodily movable portions for manipulation in effecting straightening movement of the linkage, and plate-like means secured to said disk structure and having guide slots for, and axially outwardly through which project, the manipulating portions of said toggle linkage.

5. A quick detachable wheel assembly, comprising a hub structure having an axle-receiving tubular portion and a radially disposed flange portion surrounding said tubular portion, said flange portion being provided with circumferentially spaced projections extending axially outwardly, a disk structure having a central opening to receive said tubular portion and having a surrounding web portion for disposition alongside the axially outer surface of said flange portion, said web portion being provided in spaced relation to said opening with apertures to receive the projections of said hub portion, said projections being of a length to project axially outwardly beyond those parts of the web portion which surround said apertures and the projecting portion of each of said projections being provided on its radial outer surface with a ring-receiving groove, a resilient split ring disposed on the axially outer surface of the web portion of said disk structure for removable seating engagement in the grooves of said projecting portions, said ring having a normal tendency to radially contract to a size to seat in such grooves, a pair of toggle links, means by which they are pivotally connected, means by which said links are pivotally connected to the end portions of said ring, the toggle links effecting, upon movement toward straightening relationship, radial expansion of the ring to disengage it from said grooves and thereby permit removal of the disk structure from the hub structure, the means by which said toggle links are pivotally connected and the means by which said toggle links are pivotally connected to the ring being provided with axially outwardly extending toggle manipulating portions, and plate means secured to said disk structure and having guiding slots axially outwardly through which extend said toggle manipulating portions, the guiding slot for the toggle manipulating portion of the means by which the links are pivotally connected being a substantially radially disposed slot.

6. A quick detachable wheel assembly, comprising a hub structure having an axle-receiving tubular portion and a radially disposed flange portion surrounding said tubular portion, said flange portion being provided with circumferentially spaced projections extending axially outwardly, a disk structure having a central opening to receive said tubular portion and having a surrounding web portion for disposition alongside the axially outer surface of said flange portion, said web portion being provided in spaced relation to said opening with apertures to receive the projections of said hub portion, said projections being of a length to project axially outwardly beyond those parts of the web portion which surround said apertures and the projecting portion of each of said projections being provided on its radial outer surface with a ring-receiving groove, a resilient split ring disposed on the axially outer surface of the web portion of said disk structure for removable seating engagement in the grooves of said projecting portions, said ring having a normal tendency to radially contract to a size to seat in such grooves, a pair of toggle links, means by which they are pivotally connected, means by which said links are pivotally connected to the end portions of said ring, the toggle links effecting, upon movement toward straightening relationship, radial expansion of the ring to disengage it from said grooves and thereby permit removal of the disk structure from the hub structure, the means by which said toggle links are pivotally connected and the means by which said toggle links are pivotally connected to the ring being provided with axially outwardly extending toggle manipulating portions, and plate means secured to said disk structure and having guiding slots axially outwardly through which extend said toggle manipulating portions, the guiding slot for the toggle manipulating portion of the means by which the links are pivotally connected being a substantially radially disposed slot and the guiding slots for the toggle manipulating portions of the means by which the links are pivotally connected to the ring being slots generally normal to such radially disposed slot.

7. A quick detachable wheel assembly, comprising a hub structure having an axle-receiving tubular portion and a radially disposed flange portion surrounding said tubular portion, said flange portion being provided with circumferentially spaced projections extending axially outwardly, a disk structure having a central opening to receive said tubular portion and having a surrounding web portion for disposition along the axially outer surface of said flange portion, said web portion being provided in spaced relation to said opening with apertures to receive the projections of said hub portion, said projections being of a length to project axially outwardly beyond those parts of the web portion which surround said apertures and the projecting portion of each of said projections being provided on its radial outer surface with a ring-receiving groove, a resilient split ring disposed on the axially outer surface of the web portion of said disk structure for removable seating engagement in the grooves of said projecting portions, said ring having a normal tendency to radially contract to a size to seat in such grooves, said ring and said grooves being of corresponding tapered form in cross dimension so that said ring seats in said grooves with a wedging effect, and toggle linkage pivotally connected to the end portions of said ring for effecting, upon movement toward straightening relationship, radial expansion of said ring to disengage it from said grooves and thereby permit removal of the disk structure from the hub structure, said toggle linkage being provided with bodily movable portions for manipulation in effecting straightening movement of the linkage, said bodily movable manipulating portions extending axially outward substantially beyond the adjacent outermost axial surfaces of the links of said linkage.

8. A quick detachable wheel assembly, comprising a hub structure having an axle-receiving tubular portion and a radially disposed flange portion surrounding said tubular portion, said flange portion being provided with circumferentially spaced projections extending axially outwardly, a disk structure having a central opening to receive said tubular portion and having a surrounding web portion for disposition along the axially outer surface of said flange portion, said web portion being provided in spaced relation to said opening with apertures to receive the projections of said hub portion, said projections being of a length to project axially outwardly beyond those parts of the web portion which surround said apertures and the projecting portion of each of said projections being provided on its radial outer surface with a ring-receiving groove, a resilient split ring disposed on the axially outer surface of the web portion of said disk structure for removable seating engagement in the grooves of said projection portions, said ring having a normal tendency to radially contract to a size to seat in such grooves, toggle linkage pivotally connected to the end portions of said ring for effecting, upon movement toward straightening relationship, radial expansion of said ring to disengage it from said grooves and thereby permit removal of the disk structure from the hub structure, and lugs carried by said disk structure for retaining said ring in assembly with said disk structure upon such radial expansion of the ring, said toggle linkage being provided with bodily movable portions for manipulation in effecting straightening movement of the like, said bodily movable manipulating portions extending axially outward substantially beyond the adjacent outermost axial surfaces of the links of said linkage.

9. A quick detachable wheel assembly, comprising a hub structure having an axle-receiving tubular portion and a radially disposed flange portion surrounding said tubular portion, said flange portion being provided with circumferentially spaced projections extending axially outwardly, a disk structure having a central opening to receive said tubular portion and having a surrounding web portion for disposition alongside the axially outer surface of said flange portion, said web portion being provided in spaced relation to said opening with apertures to receive the projections of said hub portion, said projections being of a length to project axially outwardly beyond those parts of the web portion which surround said apertures and the projecting portion of each of said projections being provided on its radial outer surface with a ring-receiving groove, a resilient split ring disposed on the axially outer surface of the web portion of said disk structure for removable seating engagement in the grooves of said projecting portions, said ring having a normal tendency to radially contract to a size to seat in such grooves, a pair of toggle links, means by which they are pivotally connected to each other, means by which said links are pivotally connected to the end portions of said ring, the toggle links effecting, upon movement toward straightening relationship, radial expansion of the ring to disengage it from said grooves and thereby permit removal of the disk structure from the hub structure, the means by which the toggle links are pivotally connected to each other being provided with a bodily movable portion for manipulation in effecting straightening movement of the toggle links, said bodily movable manipulating portion extending axially outward substantially beyond the adjacent outermost axial surfaces of said toggle links for convenient access thereto.

10. A quick detachable wheel assembly, comprising a hub structure having an axle-receiving tubular portion and a radially disposed flange portion surrounding said tubular portion, said flange portion being provided with circumferentially spaced projections extending axially outwardly, a disk structure having a central opening to receive said tubular portion and having a surrounding web portion for disposition alongside the axially outer surface of said flange portion, said web portion being provided in spaced relation to said opening with apertures to receive the projections of said hub portion, said projections being of a length to project axially outwardly beyond those parts of the web portion which surround said apertures and the projecting portion of each of said projections being provided on its radial outer surface with a ring-receiving groove, a resilient split ring disposed on the axially outer surface of the web portion of said disk structure for removable seating engagement in the grooves of said projecting portions, said ring having a normal tendency to radially contract to a size to seat in such grooves, a pair of toggle links, pivot means by which they are pivotally connected to each other, means by which said links are pivotally connected to the end portions of said ring, the toggle links effecting, upon movement toward straightening relationship, radial expansion of the ring to disengage it from said grooves and thereby permit removal of the disk structure from the hub structure, the pivot means by which the toggle links are pivotally connected to each other being provided with an integral extension bodily movable in a radial outward direction for effecting straightening movement of the toggle links, said pivot means extension projecting axially outward substantially beyond the adjacent outermost axial surfaces of said toggle links for convenient access thereto.

WOOLSEY D. PECK.

REFERENCES CITED

The following references are of record in the file of this patent:

UNITED STATES PATENTS

| Number | Name | Date |
| --- | --- | --- |
| 852,998 | Bridgers | May 7, 1907 |
| 1,139,151 | Arthur | May 11, 1915 |
| 1,402,440 | Putnam | Jan. 3, 1922 |
| 1,425,025 | LaCour | Aug. 8, 1922 |
| 1,689,273 | Zipper | Oct. 30, 1928 |
| 2,210,451 | Galindo | Aug. 6, 1940 |
| 2,513,032 | Lewis | June 27, 1950 |

FOREIGN PATENTS

| Number | Country | Date |
| --- | --- | --- |
| 581,264 | France | 1924 |
| 596,212 | France | 1925 |